(12) United States Patent
Avery et al.

(10) Patent No.: US 9,817,806 B1
(45) Date of Patent: Nov. 14, 2017

(54) ENTITY-BASED CONTENT CHANGE MANAGEMENT WITHIN A DOCUMENT CONTENT MANAGEMENT SYSTEM

(71) Applicant: International Business Machines Corporation, Armonk, NY (US)

(72) Inventors: Kenytt D. Avery, Newport Beach, CA (US); Edward L. Bader, Los Angeles, CA (US); Jean-Marc Costecalde, Irvine, CA (US); Chi M. Nguyen, Irvine, CA (US); Kevin N. Trinh, Garden Grove, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/194,778

(22) Filed: Jun. 28, 2016

(51) Int. Cl.
  *G06F 17/30* (2006.01)
  *G06F 17/24* (2006.01)
  *G06F 17/21* (2006.01)

(52) U.S. Cl.
  CPC ............ *G06F 17/24* (2013.01); *G06F 17/211* (2013.01); *G06F 17/30011* (2013.01); *G06F 17/3053* (2013.01); *G06F 17/30165* (2013.01)

(58) Field of Classification Search
  CPC ................................................ G06F 17/30864
  USPC .................... 707/758; 715/219, 780
  See application file for complete search history.

(56) References Cited

U.S. PATENT DOCUMENTS

| 6,681,369 B2 | 1/2004 | Meunier et al. |
| 8,090,688 B2 | 1/2012 | Petri |
| 8,949,242 B1 | 2/2015 | Lin et al. |
| 9,015,118 B2 | 4/2015 | Velasco |
| 9,286,334 B2 | 3/2016 | Velasco |
| 2002/0065845 A1* | 5/2002 | Naito ................ G06F 17/30634 715/248 |
| 2012/0330946 A1* | 12/2012 | Arredondo ........ G06F 17/30528 707/728 |
| 2013/0018858 A1 | 1/2013 | Velasco |
| 2013/0124513 A1* | 5/2013 | Bignert ............. G06F 17/30707 707/728 |
| 2013/0198145 A1 | 8/2013 | Avery et al. |
| 2014/0280204 A1 | 9/2014 | Avery et al. |
| 2015/0127637 A1* | 5/2015 | Cavanagh ........... G06F 17/3053 707/723 |

* cited by examiner

*Primary Examiner* — Baoquoc N To
(74) *Attorney, Agent, or Firm* — Weitzman Law Offices, LLC

(57) ABSTRACT

A method of providing for review of changes within documents involves storing an entity-specific weight value for each of multiple sections of a document, receiving an indication that changes have thereafter been made to one or more sections of the document, determining a change value indicative of a quantity of changes made within each section of the document, separately for at least each entity that is not the one that made the changes, calculating an entity-specific provenance value by multiplying the change value within each section by the assigned entity-specific weight value for each section, to produce an entity-specific section value for each section, and summing the entity-specific section values. The method further involves comparing the entity-specific provenance value against the respective entity's stored review threshold value, and when an entity-specific provenance value satisfies an entity's review threshold value, constructing and sending a review notification to that entity.

1 Claim, 5 Drawing Sheets

ENTITY-BASED CONTENT CHANGE MANAGEMENT WITHIN A DOCUMENT CONTENT MANAGEMENT SYSTEM

FIELD OF THE INVENTION

This disclosure relates generally to computers and, more particularly, to computerized content management systems.

BACKGROUND

In a content management system, tracking changes between versions of a document is important. The change in contents of a document usually is measured based on the amount of words changed, where each word is treated equally, and could be expressed as a numeric "provenance" value. However, in reality, documents usually contain different sections with different levels of importance for example, a change may have differing importance if it is made in a document's abstract, summary or body.

One current solution is manual review where, when a change happens in the document, the submitter of the change sends an email to people who might be interested and asks them to review the document. This is costly, time consuming, and erroneous because, sometimes, the submitter might send to too many, or too few reviewers.

SUMMARY

We have devised an improvement to the function and operation of content management systems (CMS) as well as to CMS technology itself.

When a document is shared by different teams in an organization, individual changes might have different meaning and importance to each of the entities (individuals, teams or departments). For example, a change made in the "staffing" section by engineering personnel will likely have a lot of meaning to the development manager and engineers, but no importance to marketing personnel. However, if the change in the "staffing" section is also accompanied by a change in the "schedule" section, it might then have some importance to marketing personnel. Similarly, a change in the "estimated budget" or "resources" sections by engineering personnel will likely be significant to the financial staff as well as to management.

Recognizing that current CMS technology cannot take this into account, and that this inability is a problem, the instant disclosure provides a more accurate way to calculate the provenance of a document based on the importance of the change with respect to the users, teams or job functions (i.e., particular "entities") instead of only the amount of the change. As a result, with our solution to this problem, an entity only needs to review a document when the changes are sufficiently important to it (based upon a combination of where the changes were made and the "quantity" of changes), according to their specification of importance, thereby saving time and effort by avoiding having to review nominal or irrelevant changes, and, as a result, money.

One aspect of this disclosure involves a method of providing for review of changes within documents, where the changes may have different relevance to different entities having access to the documents. The method is performed within a system involving at least one processor and non-transitory storage accessible to the at least one processor and containing the document. The method involves maintaining in the storage, for each of the different entities, at least one review threshold value; receiving a request, at the at least one processor, to store a document in the non-transitory storage, the document being stored such that at least two entities will have edit capability. If the document has not previously been partitioned, the document is partitioned into multiple sections, using the at least one processor. The partitioning is based on one or more of i) defined section labels, or ii) content within the document. If the document is already partitioned but no weights have been assigned to it, or once the document has initially been partitioned, and the document has been stored in the storage, using the at least one processor, for each of the at least two entities, an entity-specific weight value for each of the multiple sections of the document is stored and associated with the multiple sections of the document. The method further involves receiving an indication that changes have been made to one or more sections of the document by one of the at least two entities, and in response to the receiving, using the at least one processor i) determining a change value indicative of a quantity of changes made within each section of the document, ii) separately for at least each of the at least two entities that is not the one that made the changes, calculating an entity-specific provenance value by A) multiplying, on a section basis, the change value within each section by the assigned entity-specific weight value for each section, to produce an entity-specific section value for each section, and B) summing the entity-specific section values. Separately, for at least each of the at least two entities that did not make the changes, the entity-specific provenance value is compared against the respective entity's stored review threshold value. When any entity-specific provenance value satisfies the review threshold value for any corresponding entity a review notification is sent to each such corresponding entity for which the review threshold value was satisfied.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
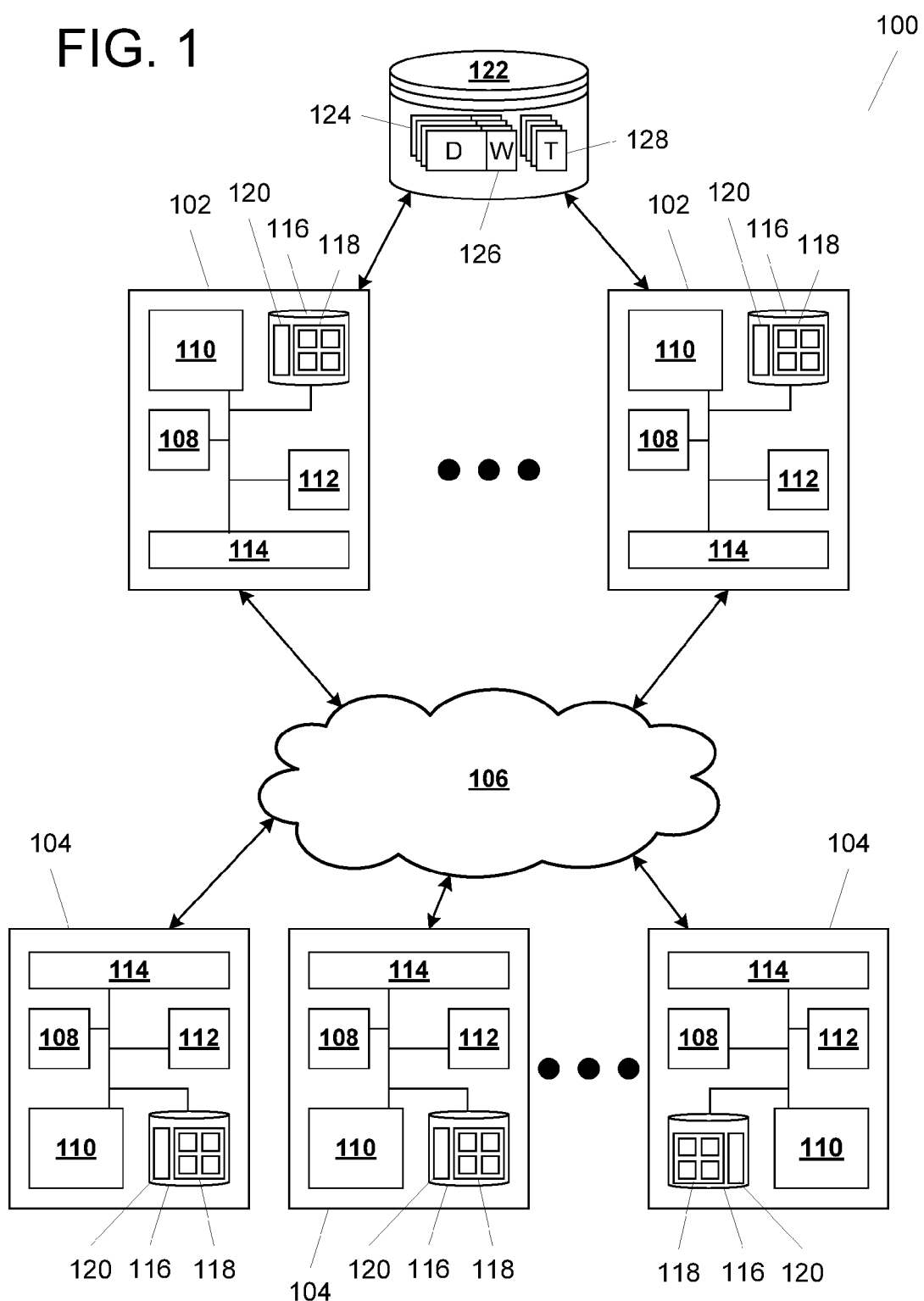
FIG. 1 illustrates, in simplified form, one example system environment containing an example implementation of the claimed invention as described herein.

This disclosure provides a technical solution to address the aforementioned problems inherent with current content management systems.

At the outset, the named inventor's U.S. Patent Publication No. 2014/0280204, assigned to the assignee of the current application is incorporated herein by reference in its entirety as if fully set forth herein. However, to the extent this application contains any express definitions, those express definitions are intended to override and supercede any definitions or constructions contained therein.

In addition, as used herein any reference to "storage" is to be understood to be defined to mean, any physical storage medium that can receive and maintain data, data-containing structures, and program instructions in a non-transitory manner, for example, such as non-transient solid state memory, a magnetic hard drive, a CD or DVD, a tape drive, or an analogous or equivalent storage medium type would.

Finally, the term "entity" is used herein to interchangeably refer to, and is intended to mean and encompass any of: an individual user, a team of users, a department or a job function where an interest in reviewing change(s) to a document may exist.

In simplified overview, our approach divides a document into sections and uses multiple weight value lists associated with the document, one for each entity, to identify which entit(y/ies) should review any given document change(s). Advantageously, each entity's weight value list will have a separate entity-specific weight value assigned for each section. Depending upon the particular implementation and (CMS), the weight value lists could either be maintained as one or more file(s) associated with the main document, or as property values that are part of the main document. The value used for the weight value will be a number within a specific defined range that is defined, for example, by default for the implementation or by an individual organization. Depending upon the implementation, the range could be very narrow, for example, integer values from 0 to 5, have finer granularity, for example 0 to 5 in 0.1 increments, or could allow a wider range, for example, from 0 to 10 in 0.1 increments or 0 to 50 in 0.5 increments, with the lowest values typically being representative of a range from no importance/significance to little importance/significance of the section to that entity. The higher values would therefore represent a range of greater importance/significance to most important/significant of a section to that entity. Thus, the more important a section is to a particular entity, the higher the weight value that will be assigned to it.

The change in each document is also expressed as a number value, typically a percentage value, that is determined using a business rule. Depending upon the particular implementation, the business rule can simply be a measure of number of changed words (added or removed) as a raw count, or relative to the total number of words in the section. Other business rules can be used as well, for example, the changes could be reflected using point values, where different types of changes are assigned different point values. For example, each mere spelling or punctuation change might receive a nominal fixed point value (or no value), each replacement of one or more words in a sentence might receive a higher fixed value, and deletion or addition of a sentence or paragraph might respectively receive even higher point values. Still further, point values could be assigned for things like movement of text within the section or to another section. In some implementations, the point values could then simply be summed, or, more likely, one or more can be scaled in some manner relative to their significance within the section. For example, word changes relative to total words, sentence additions/deletions relative to total number of sentences, paragraph additions/relative to total number of paragraphs, or using some method described in our incorporated U.S. Patent Publication. Thus, it should be appreciated that there are a myriad of ways that a value can be generated to represent the changes in a section.

However the changes are calculated, the assigned weight value will cause each change in a section to be magnified (if greater than 1) or diminished (if less than 1). Since each entity can have a different weight value for each section, by virtue of the weight values, the same changes to a document section will be represented as a different value for each entity.

An entity-specific provenance value for the whole document can then be calculated based on all of those entity-specific "magnified" values. Thus, a change to a section deemed unimportant to an entity will cause little to no change in the provenance value for that document and entity, whereas a change to a section that is important to that entity will be reflected in a larger change to the provenance value for that document and entity.

Depending upon the particular implementation, the entity-specific provenance value can be calculated differently. For example, some implementations will do so merely by summing the individual entity-specific section values, whereas others will average that sum over the total number of sections in the document. Still others may calculate the entity-specific provenance value by summing the individual entity-specific section values and dividing that sum by the total number of sections that were changed (as opposed to the total number of sections in the document).

Advantageously, in order to further allow for control over when an entity should know about changes made to a document, an entity-specific review threshold value can be specified against which the provenance value can be compared. By comparing the two, an entity will be notified of a potential need to review the changes only when the entity-specific review threshold value is satisfied, for example, when the provenance value is greater than the entity-specific review threshold value, or when the provenance value is greater than/equal to the entity-specific review threshold value.

With the foregoing overview in mind, FIG. 1 illustrates, in simplified form, one example system environment 100 containing an example implementation of the invention described herein. Specifically, the system environment 100 includes one or more server systems 102 and one or more client or user systems 104. The server systems 102 and client or user systems 104 may be remote from each other and communicate over a network 106. The network may be implemented by any number of any suitable communications media (e.g., wide area network (WAN), local area network (LAN), Internet, intranet, etc.). Alternatively, two or more of the server systems 102 and client systems 104 may be local to each other, and communicate via any appropriate local communication medium (e.g., local area network (LAN), hardwire, wireless link, intranet, etc.).

The server systems 102 and client or user systems 104 may be implemented using any conventional or other computer systems, preferably equipped with a display or monitor 108, one or more processor(s) 110, memory 112 (e.g., RAM/ROM) and/or input/output 114, for example, one or more of network interfaces or communications devices (e.g., modem(s), network card(s), etc., or input device(s) (e.g., keyboard, mouse, speech to text, text to speech, or other input device), and storage 116 that will have stored therein, program software 118 (e.g., communications/messaging software, word processing software, provenance calculation software, document partitioning software, section weight generation/handling software, browser/interface software, etc.), for access/execution by the processor(s) 110, as well as local data 120.

The system environment 100 further includes storage 122 that stores, for example, documents 124, associated section weights 126 (entity-specific) and entity-specific thresholds 128. Depending upon implementation variant, document-associated weights and/or thresholds may be maintained with/as part of the document(s), or maintained separately, for example, using a database structure, the particular way that the document is associated with the weights and/or the way the thresholds are maintained, being unimportant to the invention.

The client/user systems 104 enable one or more entities to access (request and/or retrieve) desired documents (e.g., documents, web sites, news stories, etc.) from the storage 122 (either directly, or via the server systems 102, based upon implementation variant) for review and/or modification. The client systems 104 will also present a graphical user (e.g., GUI, etc.) or other interface (e.g., command line prompts, menu screens, etc.) to an entity to solicit information pertaining to its desired document section weighting and threshold value(s), and may also provide document-related information including, for example, for a document, its version/change history, section values, provenance value, etc.

The server systems 102 include programming 118 that will, for example, partition a document into sections (e.g., the introduction, body, abstract, etc.), generate or receive and assign weights to the various sections of a document, score documents based upon changes made in any section(s) from one version of to the next, calculate and compare provenance values to threshold values, and send review notifications to any entities, as required, based upon the comparison(s).

Figure 2:
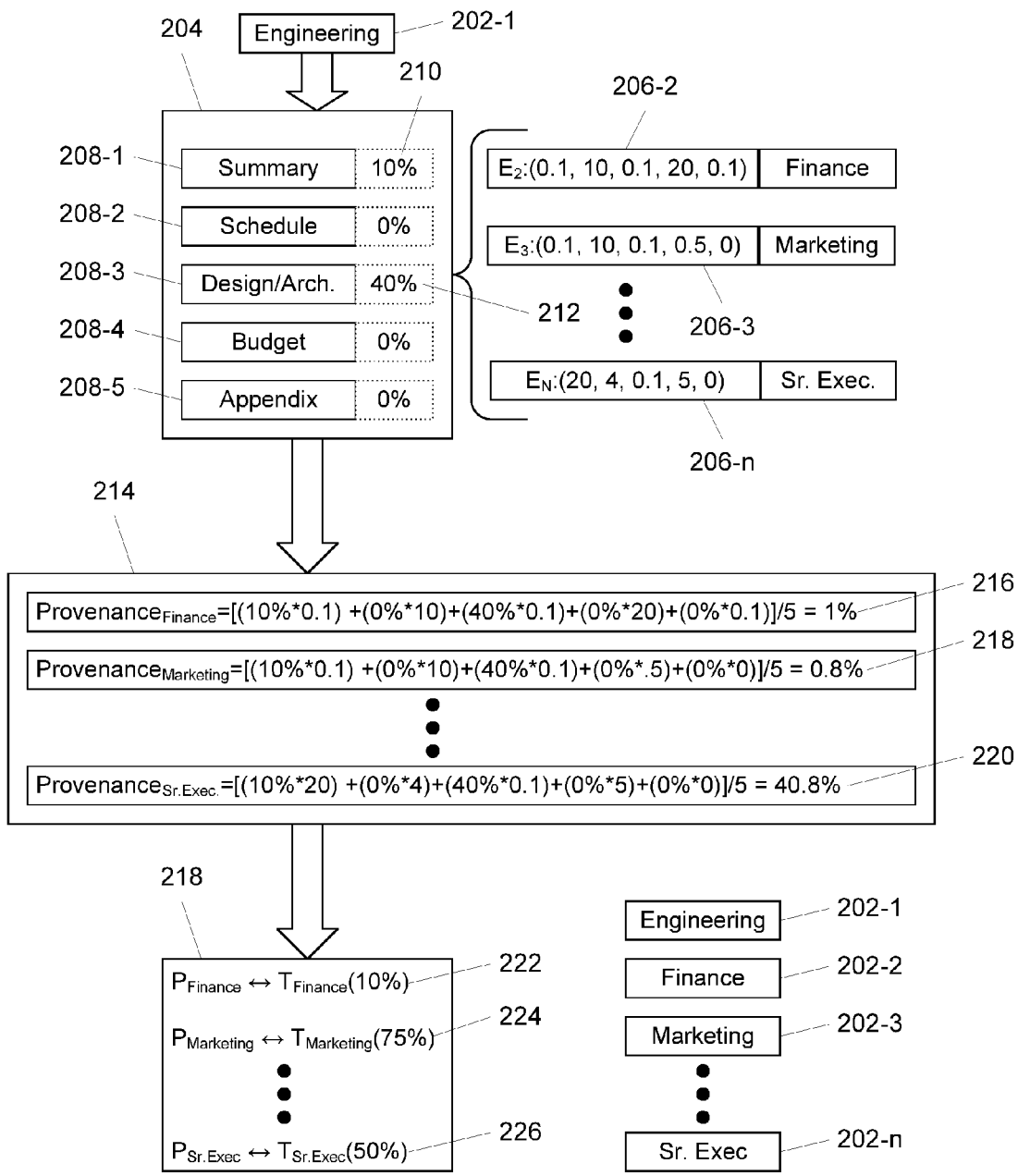
FIG. 2 illustrates, in simplified form, a first part of one overview example as would happen within a CMS implementing our approach as described herein.
Figure 3:
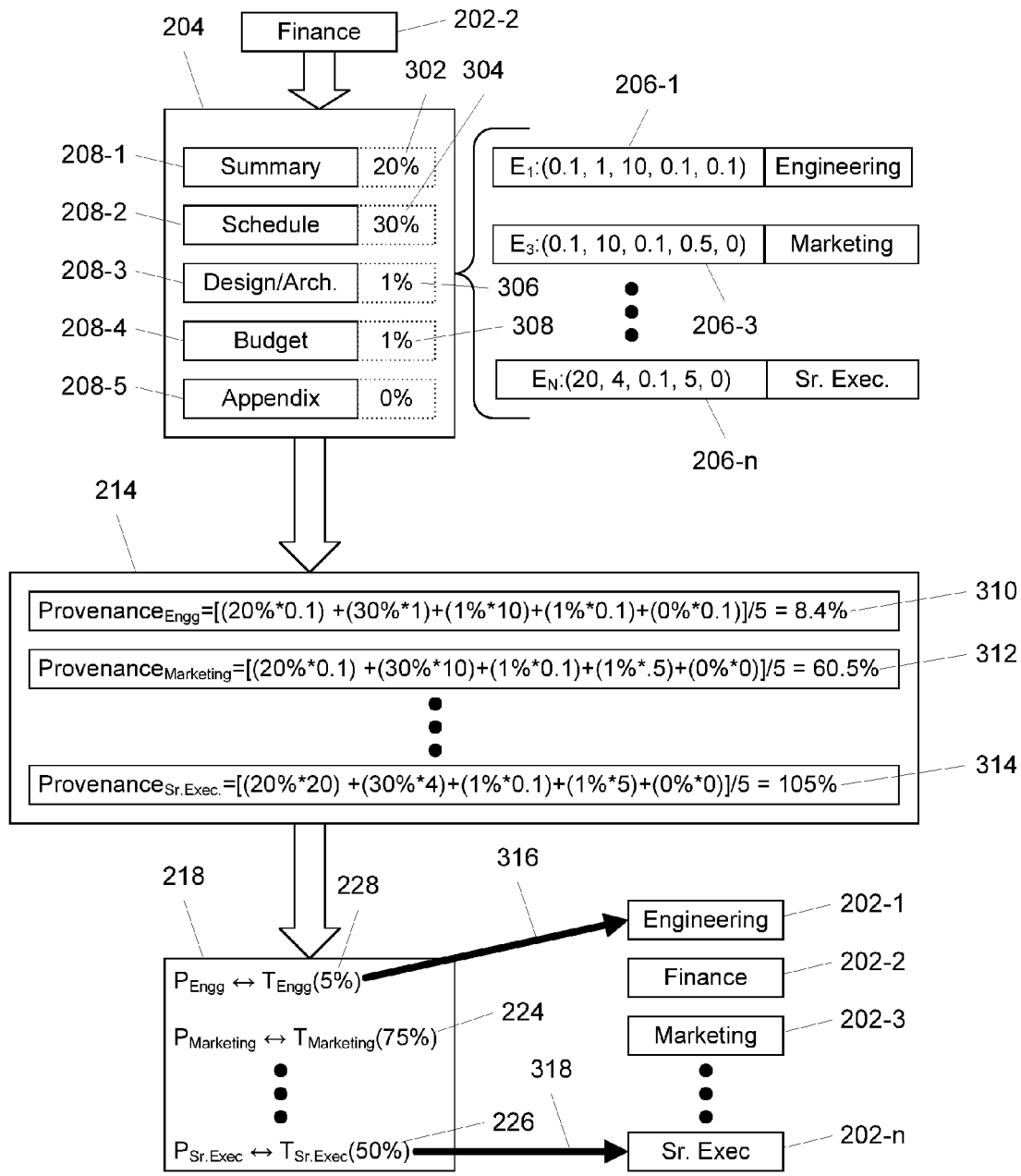
FIG. 3 illustrates, in simplified form, a second part of the overview example.
Figure 4:
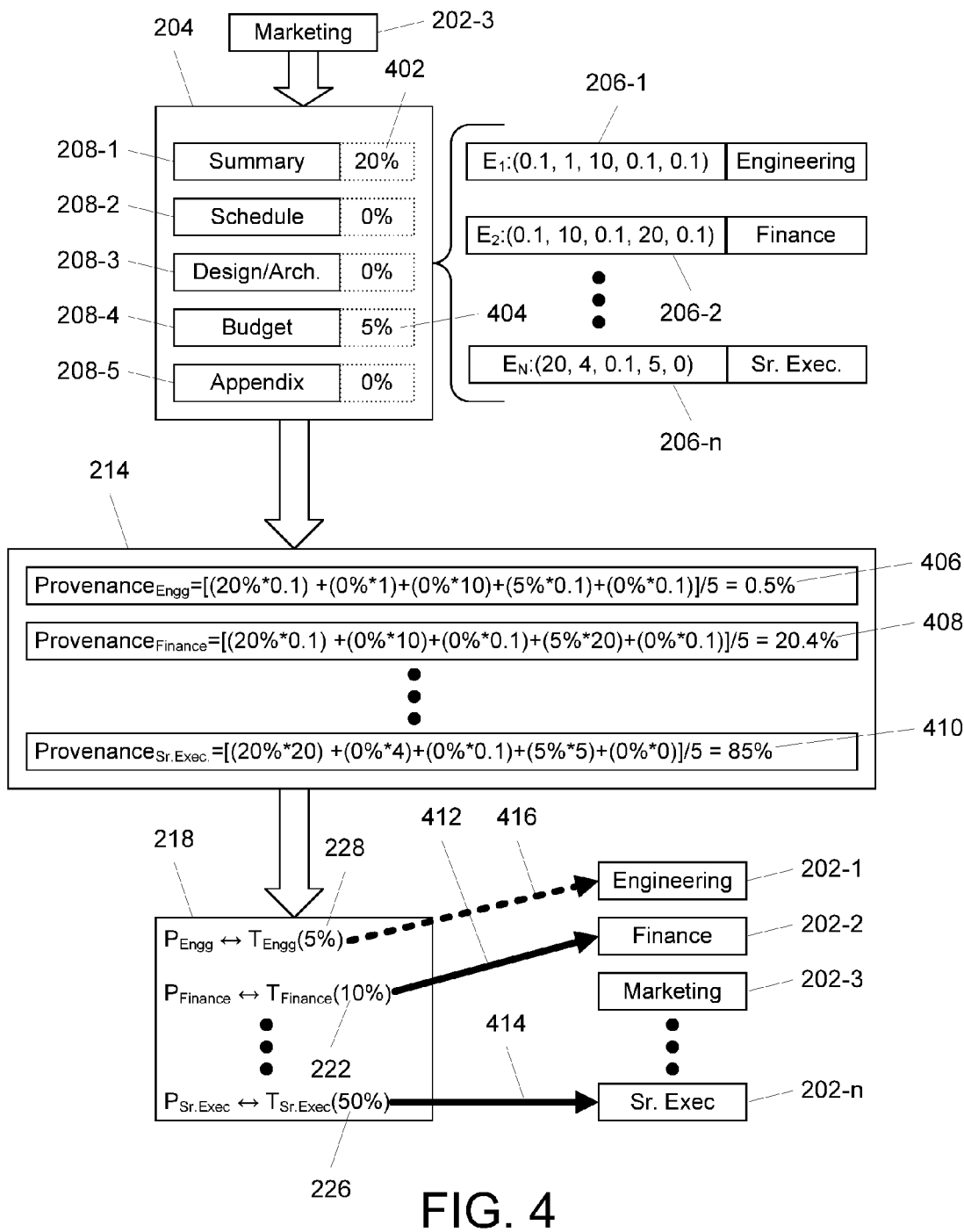
FIG. 4 illustrates, in simplified form, a third part of the overview example.

Having described the various components, an illustrative example will now be provided with reference to FIGS. 2-4. For purposes of the example only, presume that an organization is made up of at least four entities (e.g., individuals, functions or departments), in this case, Engineering, Finance, Marketing and the Senior Executives. With those presumptions, FIG. 2 illustrates, in simplified form, a first part of one overview example as would happen within a CMS implementing our approach as described herein.

As shown, an entity 202-1 (Engineering) creates a document 204 and requests that it be stored in the CMS and accessible to the other entities 202-2 (Finance), 202-3 (Marketing), . . . , 202-*n* (Senior Executives) in the organization for review. In addition, at least one of those entities, for example, Finance and Marketing 202-2, 202-3 also have the ability to edit the document 204.

Based upon the storage request, since the document 204 is a new document that has not previously been partitioned, at least one processor (operating under program control) partitions the document into sections. Depending upon the particular implementation and document, this may be based upon defined section labels or based upon content within the document. Moreover, the partitioning may involve true breaking up of the document into sections or it may simply involve creation of some data structure that identifies where each section begins and ends. Then the partitioned document is then stored.

Once stored, at least the various other entities 202-2, 202-3, . . . , 202-*n* (as well as potentially the creating entity 202-1) are solicited to each provide (directly or indirectly) a weight value for each section that will specify how important it would be for that entity to know about changes to those sections, for purposes of information and/or review. In addition, each entity 202-2, 202-3, . . . , 202-*n* will have specified (on an individual document basis, for some set of documents, or overall for all documents) a threshold value to be used to cull changed documents that they want to potentially review from changed documents that they do not want to potentially review, as will be explained in detail below.

The responses from the entities 202-2, 202-3, . . . , 202-*n* are associated with the document 204 and stored as entity-specific weight values 206-2, 206-3, . . . , 206-*n*. Thus, as shown in FIG. 2, the document 204 has been partitioned into five sections: "Summary" 208-1, "Schedule" 208-2, "Design/Architecture" 208-3, "Budget" 208-4 and "Appendix" 208-5 and, for example, Finance 202-2 has (directly or indirectly) assigned weight values 206-2, specifically, a weight value of "0.1" to the "Summary" section 208-1, a weight value of "10" to the "Schedule" section 208-2, a weight value of "0.1" to the "Design/Architecture" section 208-3, a weight value of "20" to the "Budget" section 208-4 and a weight value of "0.1" to the "Appendix" section 208-5. Likewise, Marketing 202-3 has assigned weight values 206-3 of "0.1", "10", "0.1", "0.5" and "0" to those respective sections 208-1, 208-2, 208-3, 208-4, 208-5 and the Senior Executives have assigned weight values 206-3 of "20", "4", "0.1", "5" and "0" to those respective sections 208-1, 208-2, 208-3, 208-4, 208-5.

Now, presume that at some point thereafter, Engineering 202-1 makes some changes to the document 204, for example, to the "Summary" section 208-1 and "Design/Architecture" section 208-3 and then re-saves the document 204 in the CMS.

As a result, an indication is received by programming that is part of, or associated with, the CMS and is executed by the processor, indicating that changes have been made to at least one section of the document 204. As a result, based upon the quantity (and optionally type) of changes in each section, the programming will determine a change value that is indicative of the changes made. For example, as shown in FIG. 2, it has been determined that there was a 10% change 210 made to the "Summary" section 208-1 and a 40% change 212 made to the "Design/Architecture" section 208-3.

Based upon these changes, for at least each of the entities that did not make the changes, the provenance calculation programming 214 will calculate an entity-specific provenance value 216, 218, 220 by multiplying, on a section basis, the change values within each section by the section-specific weight values 206 that each entity assigned. Those values are then summed. Optionally, as shown in FIG. 2, the sum is then divided by the number of sections. Thus, as shown in FIG. 2, the provenance value for the Finance entity 202-2 is 1%, the provenance value for the Marketing entity 202-3 is 0.8% and the provenance value for the Senior Executive entity 202-*n* is 40.8%.

As noted above, each entity 202-2, 202-3, . . . , 202-*n* has a specified review threshold value 222, 224, 226 that is applicable to at least this document 204. As shown in FIG. 2, the Finance entity 202-2 has a review threshold value 222 of 10%, the Marketing entity 202-3 has a review threshold value 224 of 75% and the Senior Executive entity 202-*n* has a review threshold value 226 of 50%. The threshold values 222, 224, 226 are, as noted above, a way for an entity to further limit the amount of changes that must be made to a section and/or overall before they want to be notified about the changes and potentially review the document as a result.

Thus, comparison programming 228 will compare each entity-specific provenance value 216, 218, 220 against that respective entity's review threshold value 222, 224, 226. Thus, as shown in FIG. 2, none of the entity-specific provenance values 216, 218, 220 satisfy their respective review threshold values 222, 224, 226, so nothing further happens.

FIG. 3 illustrates, in simplified form, a second part of the overview example.

As shown in FIG. 3, presume now that subsequent to the events of FIG. 2, the Finance entity 202-2 accesses the document 204 and makes changes and stores the document. Since the document is already partitioned, that does not need to happen again, so the change calculation process described in connection with FIG. 2 repeats and it is now determined that the change value 302 for the Summary section 208-1 is 20%, the change value 304 for the Schedule section 208-2 is 30%, and the change values 306, 308 for each of the Design/Architecture section and Budget section 208-4 are the same at 1%.

Provenance values 310, 31, 314 are then respectively calculated by the provenance calculation programming 214, for at least each entity 202-1, 202-3, . . . , 202-n that did not make the changes, by multiplying the respective weight values 206-1, 206-3, 206-n and corresponding change values 302, 304, 306, 308 for each section as described above in connection with FIG. 2.

Then, as was described in connection with FIG. 2, those calculated provenance values are compared to each respective entity's review threshold value 224, 226, 228, and it is determined that the review threshold values 310, 314 for the Engineering entity 202-1 and Senior Executive entity 202-n are satisfied.

As a result, a review notification 316, 318 is constructed and sent to each entity for which the review threshold values were satisfied, in this example, the Engineering entity 202-1 and Senior Executive entity 202-n, so that they can have the opportunity to access the document 204 and review it (or the changes). Note here that, depending upon the particular implementation, a review notification can simply notify an entity that, based upon the importance they ascribed, a sufficient number of changes have been made to potentially warrant review by them.

FIG. 4 illustrates, in simplified form, a third part of the overview example.

Presume for purposes of FIG. 4, that, at some point after the events of FIG. 3 are complete, the Marketing entity 202-3 now makes changes to the document 204, amounting to a change value 402 of 20% for the Summary section 208-1 and a change value 404 for the Budget section 208-4. The provenance value calculation process described above repeats again to obtain provenance values 406, 408, 410, for at least each entity that did not make the changes, the entity-specific provenance values 406, 408, 410 are compared to the respective entity review thresholds 222, 226, 228, and review notifications 412, 414 are constructed and sent to those entities for which the review threshold was satisfied.

As described above, it is possible with some implementations that an entity might have a review threshold specified such that a series of individual changes are insignificant enough that the provenance value does not reach the threshold for each change in the series, but in aggregate, those changes might collectively warrant review.

Advantageously, this issue can be avoided by some implementations, ones that involve a CMS that is capable of tracking whether an entity actually opened a document for which it received a review notification and that will also store entity-specific provenance values.

For some of those implementations, the provenance calculation can further optionally involve summing the entity-specific provenance values for each entity that have been stored since the last access by that entity following creation of the document, or receipt of a review notification if involving a document that was not newly created. In this manner, once the series of changes results in the sum of the provenance values for an entity exceeding the review threshold of that entity, the entity will receive the notification covering all of the changes in aggregate. Thus, if an entity has a review threshold of 20%, and a series of four saves of changes are sequentially made by others, resulting in provenance values of 5%, 7%, 5% & 10%, the situation where that entity would never receive an review notification for those changes (because they are all below the review threshold can be avoided so that, for that entity, after the first saved change, the provenance value would be 5%, but after the second saved change, the provenance value would be treated as 12% (i.e., 5%+7%), and after the third saved change, the provenance value would be treated as 17% (i.e., 12%+5% or 5%+7%+5%). As a result, after the fourth saved change, the provenance value would be treated as 27% (i.e., 17%+10% or 5%+7%+5%+10%), so they would then receive the review notification. Likewise, this can apply for cases where the entity received a review notification but did not open the document in response and subsequent changes are made.

Thus, for example, presuming that following receipt of the review notification 316 of FIG. 3, the Engineering entity 202-1 did not open the document 204. Thereafter, when the Marketing entity 202-3 makes a subsequent change as in FIG. 4, the provenance values for the Engineering entity 202-1 can be summed (i.e., 8.4%+0.5%=8.9%) and a new review notification 416 can be sent, whereas otherwise, the provenance value of 0.5% for the Engineering entity shown in FIG. 4 would not otherwise result in satisfaction of that entity's review threshold 228 of 5% and construction/sending of a review notification.

Depending upon the particular implementation, the review notification can be an e-mail, a text message, or a message within any other form of messaging system available to the entit(y/ies) and the system, bearing in mind that different entities may use the same or different messaging systems. The important aspect here is that a review notification is sent to each relevant entity, not the particular messaging system or type of messaging system used.

Figure 5:
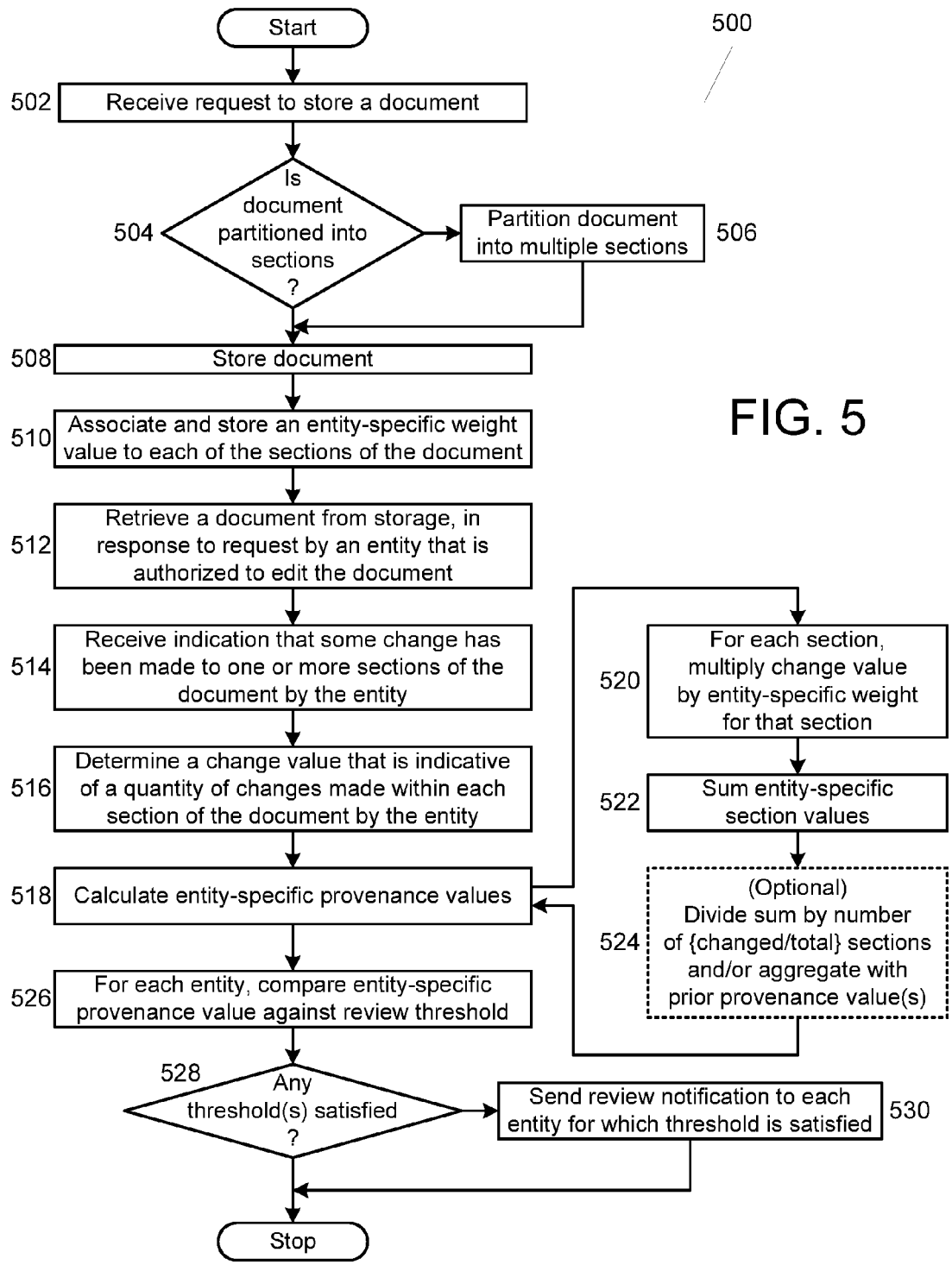
FIG. 5 is a simplified flow chart for one example variant of the process described herein.

FIG. 5 is a simplified flow chart 500 for one example variant of the process described herein.

The process begins with a request to store a document (Step 502). The system 100 checks to see whether the document is partitioned into sections (Step 504). If the document is not already partitioned into sections, the document gets partitioned into sections (Step 506) and then gets stored (Step 508) in the storage 122. Next, weights for each section are then solicited from each relevant entity, associated with their respective sections of the document, and stored (Step 510).

Thereafter, in response to a request from an entity that is authorized to edit (i.e., make changes to) the document (i.e., the entity has edit capability), the document will be retrieved from the storage 122 (Step 512).

If the entity makes any changes, a indication will be provided to the implementing programming that some change has been made to one or more sections of the document (Step 514). As a result of the change(s), a change value for each section will be calculated that is indicative of the quantity (and possibly quality) of changes made within each section by that entity (Step 516).

Next, entity-specific provenance values are calculated (Step 518). This calculation will include, for each section, computing entity-specific section values by multiplying the change value for each section by the entity-specific weight for that section (Step 520), summing the entity-specific section values (Step 522) and optionally dividing that sum by the number of sections and/or optionally aggregating that calculated provenance value with any prior provenance values calculated since the last review of that document by that entity (Step 524).

Once the entity-specific provenance values have been calculated, on an entity basis, (and optionally stored), each entity-specific provenance value is compared against a review threshold specified for that entity (Step 526).

If any of the review thresholds are satisfied (Step 528) a review notification will be constructed and sent to the entit(y/ies) for which their review threshold was satisfied (Step 530) and if none of the review thresholds were satisfied, the process is complete.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method of providing for review of changes within documents, where the changes may have different relevance to different entities having access to the documents, the method being performed within a system involving at least one processor and non-transitory storage accessible to the at least one processor and containing the document, the method comprising:
   a) maintaining in the storage, for each of the different entities, at least one review threshold value;
   b) receiving a request, at the at least one processor, to store a document in the non-transitory storage, the document being stored such that at least two entities will have edit capability;
   c) if the document has not previously been partitioned, using the at least one processor, partitioning the document into multiple sections based on one or more of
      i) defined section labels, or
      ii) content within the document;
   d) i) if the document has previously been partitioned, and stored in the non-transitory storage, but no weights have been assigned to the multiple sections, or
      ii) once the document has been partitioned in "c)", and the partitioned document has been stored in the non-transitory storage,
   then, for each of the at least two entities, using the at least one processor, storing an entity-specific weight value for each of the multiple sections of the partitioned document in the non-transitory storage and associated with the multiple sections of the document;
   e) receiving an indication that changes have been made to one or more sections of the partitioned document by one of the at least two entities, and in response to the receiving, using the at least one processor
      i) determining a change value indicative of a quantity of changes made within each section of the partitioned document,
      ii) separately for at least each of the at least two entities that is not the one that made the changes, calculating an entity-specific provenance value by
         A) multiplying, on a section basis, the change value within each section by the assigned entity-specific weight value for each section, to produce an entity-specific section value for each section, and
         B) summing the entity-specific section values;
      iii) separately for at least each of the at least two entities that did not make the changes, comparing the entity-specific provenance value against the respective entity's stored review threshold value; and
   f) when any entity-specific provenance value satisfies the review threshold value for any corresponding entity, using the at least one processor, using a messaging system associated with each corresponding entity for which the review threshold value was satisfied, constructing and sending a review notification to each such corresponding entity.

* * * * *